United States Patent Office 3,140,067
Patented July 7, 1964

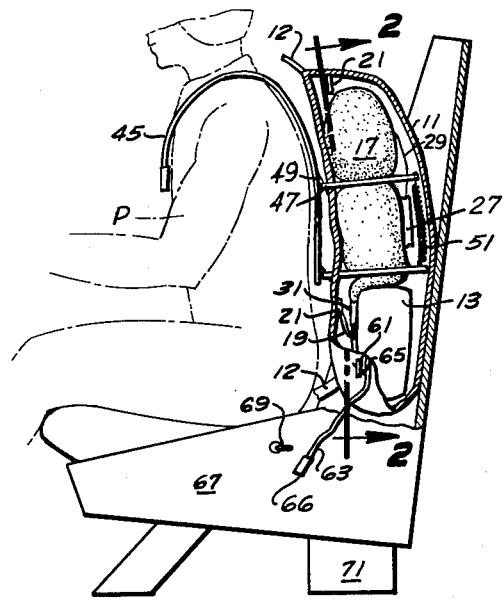
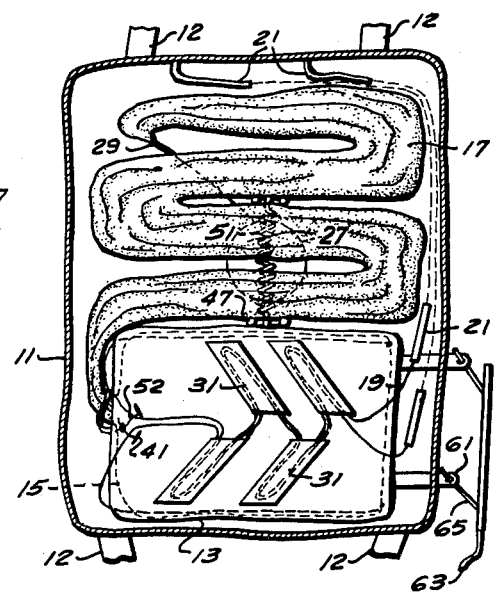
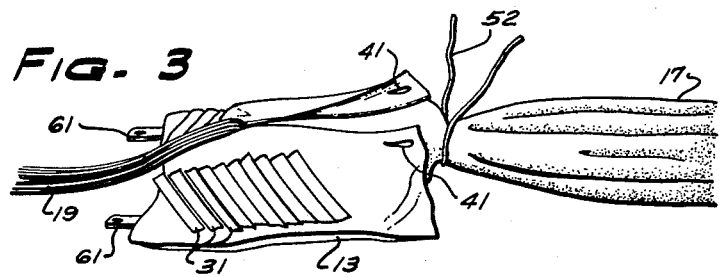
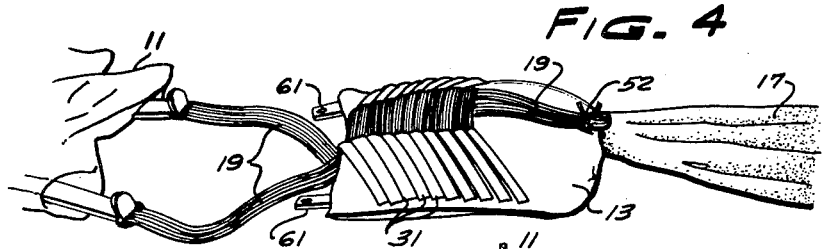
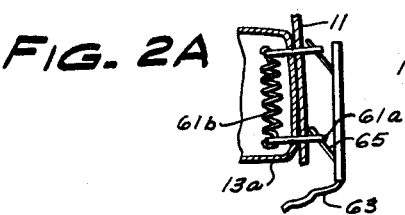

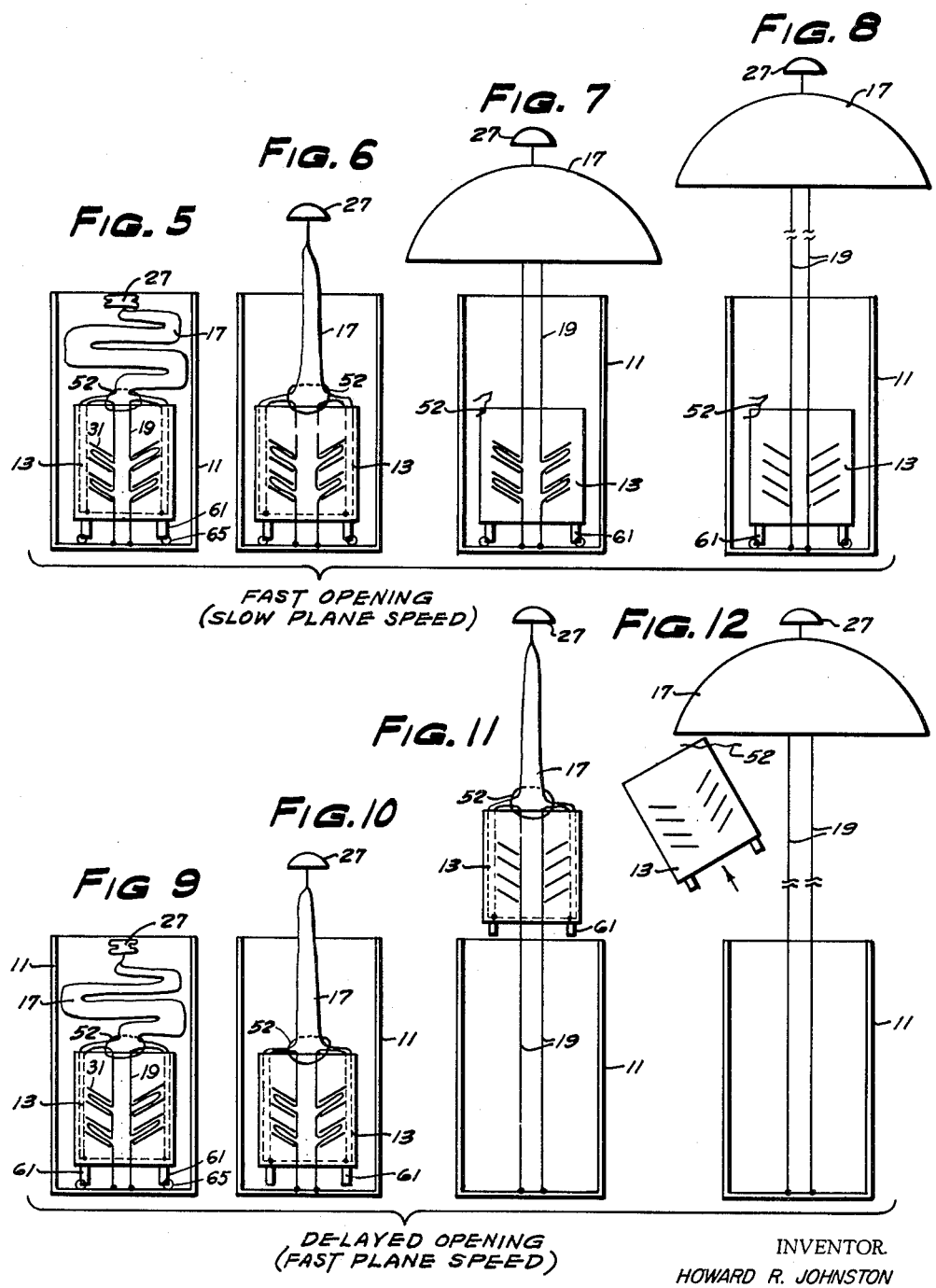

3,140,067
TWO-SPEED PARACHUTE
Howard R. Johnston, P.O. Box 103, Snohomish, Wash.
Filed Oct. 5, 1962, Ser. No. 228,604
10 Claims. (Cl. 244—148)

This invention relates to parachutes, and while the particular parachute disclosed in the drawings and to be described is intended for human use, the invention is not intended to be limited to such use.

Existing parachutes are generally of two types. One type is for slow speed low altitude use and is designed so that the canopy opens almost immediately after the rip cord is pulled. The canopy thus tends to remain generally at the level at which it opens while the pilot continues to fall to string out the suspension lines which connect the canopy to the pilot. When the lines fully straighten out, the pilot's fall is abruptly halted and he is snapped upwardly toward the canopy. This of course subjects the pilot to considerable shock, but at low speed this is not too objectionable. In any event, it must be tolerated to insure that the chute opens prior to the pilot reaching the ground.

The second general type of chute is designed for high speed bail out operation. These chutes are constructed so that the suspension lines string out prior to opening of the canopy, so that as the canopy opens, it tends to "squid out." This subjects the pilot to only a tolerable shock even though his falling speed is considerably greater than when using a slow speed chute.

For convenience, the type of chute just described will be referred to hereinafter as a delayed opening chute, while the type of chute first described above will be referred to as a quick or fast opening chute.

One disadvantage of the delayed opening chute is that if a pilot equipped with such a chute has to bail out at a low altitude, such as might be the case because of engine failure during take off, the delay in opening of the canopy would prevent the canopy from opening, or opening properly, resulting in injury or death to the pilot. On the other hand, if the pilot is equipped with a quick-opening chute this would be satisfactory for low altitude, low speed bail out, but entirely unsatisfactory for a high speed bail out because it would subject the pilot to a violent shock to severely injure him or cause his death. In addition, the shock would be so violent as to rip the canopy to shreds.

It is a main object of the present invention to provide a parachute that is constructed so that it can be operated at the option of the pilot as either a quick opening chute or a delayed opening chute, thereby enabling the pilot to use the parachute either at low altitude and low speed bail out conditions, or at high speed bail out conditions.

Another object of the invention is to provide a two speed parachute which can be quickly converted from a fast opening chute to a delayed opening chute and vice versa.

Another object of the invention is to provide a two speed parachute that can be converted while being worn and under "in flight" conditions from a fast canopy opening chute to a delayed opening chute and vice versa.

Another object of the invention is to provide a method of converting an existing delayed opening parachute to a two speed parachute, to enable it to be utilized as either a quick opening chute or a delayed opening chute.

Another object of the invention is to provide a kit to enable an existing parachute to be converted to a two speed chute.

Various other objects of the invention will be apparent from the following description taken in connection with the accompanying drawings, wherein:

FIG. 1 is a somewhat diagrammatic view of a two-speed parachute embodying the concepts of the present invention showing the same being worn by a pilot occupying a pilot's seat;

FIG. 2 is a vertical sectional view, on an enlarged scale, taken along lines 2—2 of FIG. 1;

FIG. 2A is a fragmentary vertical section showing a modified form of the invention;

FIG. 2B is a fragmentary vertical section showing a further modified form of the invention;

FIG. 3 is a perspective view showing part of my two speed chute in the process of being packed;

FIG. 4 is a view similar to FIG. 3, but showing a subsequent stage in the packing operation;

FIGS. 5 through 8 show my chute being operated as a fast or quick opening chute; and FIGS. 9 through 12 show my parachute being operated as a delayed opening chute.

The B–5 Chute

Since one of the important objects of the invention is to convert an existing delayed opening chute to a two speed chute, reference will be made to a common type of delayed opening chute now in wide use. The existing chute is commonly referred to as the B–5 parachute and has been designed for the B–52 aircraft, although it is used generally in high speed aircraft. This B–5 chute is disclosed in a number of publications, one of such publications being published under the authority of the Secretary of the Air Force and identified by the notation T. O. 14 D 1–2–81, and entitled "Technical Manual Operation and Service, Free-Type Back Style Parachute Assemblies" and dated March 1, 1958, with a notation of "Changed—November 1960." The publication also bears on the front cover the notation "AF Olmsted, Feb. 61 1M REPRINT." The particular chute under consideration is the one identified on page 1 as the 50 C 702–14 and 50 C 702–15, equipped with the type C–9 canopy.

Because of the inherent complexity of parachutes of the type under consideration, the drawings in the present application have been simplified considerably, but reference may be had to the above-identified manual for further details.

The B–5 parachute and my parachute are similar in regard to the larger components, and a description of much of the B–5 chute can be made by referring to the drawings of the present application, but it should be kept in mind that such drawings show my chute and not the prior art chute. Referring to FIGS. 1 and 2, the B–5 chute includes a pack or container 11 equipped with and secured to the usual harness assembly indicated by the reference numeral 12. The complete harness assembly straps the chute to the pilot P (FIG. 1) and is too complicated to show and thus it has been indicated only fragmentarily.

Within the pack or container is a quarter deployment bag 13 for containing and confining the lower skirt portion 15 (FIG. 2) of a canopy 17. The canopy is connected to a plurality of suspension lines 19 (only two of which are shown) which in turn are connected to suitable risers 21 which for convenience are shown connected to the pack 11. In practice, the risers are usually part of the harness of the parachute. The B–5 chute also has a pilot chute 27 connected by a bridle cord 29 to the apex of the canopy.

The quarter deployment bag 13 is provided on the exterior surface thereof with a plurality of flutes or retainer loops 31, which for convenience will be referred to as pockets in the present application, although these members are not closed at either end. The purpose of these pockets is to stow the major portions of the suspension lines 19.

In the B–5 chute, the canopy at its lower portion (but spaced from the lower edge) is equipped with a pair of locking loops (not included in my chute and thus not shown) which in the packing operation are pulled around the gathered canopy and pulled through a pair of holes 41 (FIG. 3) provided on flaps of the quarter bag. Then, the suspension lines are doubled back to form a hank or loop which is pulled through the two locking loops. In the B-5 chute the packed quarter bag and the remainder of the canopy (in a gathered and folded condition) are arranged within the pack or container, much as shown in FIGS. 1 and 2. A rip cord 45 (FIG. 1) is provided and when pulled, releases a pair of elastomer bands 47 by means of locking pins 49 on the rip cord, to enable a spring 51, connecting the opposite ends of the loop, to yank the loops through the pack to release the pilot chute and open up the pack or container.

The pilot chute contains a compression spring (not shown) which immediately inflates the pilot chute, enabling the pilot chute to yank the folded portions of the canopy from the pack and then pull the quarter bag 13 from the pack until the risers 21 are fully extended. The locking loops are sufficiently strong to retain the skirt of the canopy within the quarter bag until the lines 19 have been unstowed from the pockets 31.

The pockets 31 frictionally retain the suspension lines against release and the force of pulling the suspension lines from the pockets slows down the speed of the pilot somewhat. After all the suspension lines are unstowed, the lines are yanked free of the locking loops on the canopy, which action releases the canopy skirt from the bag, enabling it to be yanked out of the quarter bag, thus enabling the canopy to "squid out" and open. By "squid out" it is meant a generally uniform and regular outflowing or distention or dilation of the canopy. Since the suspension lines are straightened out prior to release of the canopy skirt, the "squiding out" of the canopy causes only a tolerable shock to the pilot, despite his rapid falling speed.

*Inventive Chute*

The parachute of the present invention differs from the B-5 in several respects which will now be described. In the first place, I do not utilize the locking loops but instead use a length of break cord 52 which is passed around the gathered canopy, as shown in FIG. 3, and then passed through the openings 41 in the flaps of the deployment bag as can best be appreciated by comparing FIGS. 2, 3 and 4. Thereafter, this break cord 52 is wrapped around a hank or doubled back portion of the suspension lines 19 and then a knot is formed, thereby releasably retaining the skirt portion of the canopy within the quarter deployment bag and releasably securing the suspension lines to the quarter bag.

I also provide the quarter deployment bag with a pair of tabs 61 which in the packed condition of the chute project through suitable openings provided in the pack or container 11 so that the tabs are exposed at the exterior of the pack. Referring to FIGS. 1 and 2, a lanyard 63, having locking pins 65, is mounted on the pack or container with the locking pins extending through eyes or holes in the tabs 61. The lower end of the lanyard is equipped with a clip or snap 66 (FIG. 1), and the seat 67 for the pilot is equipped with an eye 69 to which the clip 66 may be snapped.

Referring to FIG. 2A, instead of tabs 61, I may use elastomer loops or bands 61a (preferably of nylon) which are connected together at their inner ends within the quarter bag 13a by a spring 61b. The loops 61a project and are stretched through suitable openings provided in the bag 13a and pack 11 (as shown). The locking pins 65 extend through the outer ends of the loops. When the pins are jerked free, the spring 61b will yank the loops through the openings in the pack and very likely through the openings in the bag to release the bag from the pack.

It should be explained that while the parts in FIG. 2A and in fact the parts in FIGS. 1 and 2 are shown in rather loose relation to one another (for convenience in illustration) actually, the parts are compacted together, and the bands 47 (FIGS. 1 and 2) and 61a (FIG. 2A) are tightly stretched so that all the associated parts are held in close, tight relationship.

The seat 67 is assumed to be of the ejection type, and a suitable ejecting mechanism, indicated by the reference numeral 71 is shown in FIG. 1. When the ejection mechanism is actuated, the seat, chute and pilot will be ejected from the aircraft. Thereafter the pilot will kick himself free of the seat and open the chute.

*Operation*

In preparing to take off, the pilot will check the lanyard 63 to make certain that the latch or clip 66 is not connected to the eye 69. It may now be assumed that just after the pilot has taken off, circumstances require the pilot to bail out, such as for instance, because of a flame-out, or the like. At this time, the aircraft will be at a relatively low altitude and its speed will be relatively low compared to its normal cruising speed. Under these circumstances, the pilot wants a fast opening chute so that he will be certain that the parachute will be fully opened in shortest period of time, so that the pilot can make a safe landing from low altitude. In order to accomplish this, the pilot need only react in normal fashion, i.e., actuate the ejection mechanism and after he and the seat and parachute have been ejected, kick the seat free, then yank the rip cord 45 to release the pilot chute. FIGS. 5 through 8 show the functioning of the various parts after pulling of the rip cord, but before explaining these figures, it should be mentioned at this point that FIGS. 5 through 8 have been simplified as compared to FIG. 2 in several respects for ready understanding of the operation. Some of the simplifications are as follows:

In FIGS. 5-8

(1) The pilot chute is shown above the canopy.

(2) The deployment bag is shown in an upright rather than a laterally extending position.

(3) The suspension lines are shown stuffed individually in the pockets 31, rather than being stuffed together and crossing back and forth between the pockets.

(4) The suspension lines 19 are shown secured to the lower part of the container or pack rather than to risers which are connected to the upper part of the pack.

(5) The openings 41 in the quarter bag have been eliminated.

(6) The lanyard for the tabs 61 has been eliminated, and the pins 61 shown diagrammatically by way of locking circles.

FIG. 5 shows the parachute just prior to the rip cord being operated, whereas FIG. 6 shows the parachute just after the rip cord has been operated with the pilot chute 27 having projected itself from the pack and opened and having pulled the folded portion of the canopy from the pack, but showing that the folded portions are still in relatively gathered condition. Since the lanyard 63 has not been pulled, the tabs 61 are still connected to the pack or container 11. The pilot chute 27 is now exerting a separating force on the remainder of the pack attempting to pull the canopy skirt from the quarter bag, which force is resisted by the break cord 52. This means that the pilot chute is also exerting an upward pull on the quarter bag 13 which pulling force is resisted by the tabs 61 and their connections to the container or pack, namely the locking pins 65. The tabs 61 and the locking pins 65 are considerably stronger than the break cord 52 so that if the locking pins are in place, there is no possibility of separating the quarter bag from the pack or container.

The break cord 52 is designed so that under these circumstances, it will break to enable the pilot chute to yank the skirt of the canopy out of the quarter bag so that the canopy immediately opens. At this point, the rate of descent of the parachute is sharply decreased because the canopy has a much greater breaking action in the airstream than does the pilot chute.

After the canopy is opened, the increased force on the lines 19 will then yank the lines from the pockets 31 in a direction toward the canopy, and because of the increased breaking action of the main canopy, this unstowing operation takes place even faster than the unstowing effected in the B–5. In any event, it is pointed out that the canopy opens prior to the lines being unstowed so that the usual delay effected in the B–5 chute is not incurred in the chute as the chute is actuated in FIGS. 5–8. Thus, even though the pilot bails out at low altitude, the chute functions as a fast or quick opening chute and opens almost at once, so that the pilot is saved.

Now, instead of assuming that a low altitude, low speed bail out is necessary, it may be assumed that such is not necessary. The pilot is instructed that when he reaches a suitable altitude, say 5,000 feet, he should clip the lanyard 63 to the eye 69 on the seat 67 to be prepared for possible bailing out at high altitude and high speed.

It may now be assumed that the pilot does this and subsequently is required to bail out. Again, he is required to react only in normal fashion, i.e., he first actuates the ejecting mechanism 61 to eject the seat, pilot and chute from the aircraft, after which the pilot kicks the seat free by straightening out. However, this action of separating the seat from the pilot and chute will pull the lanyard 63 and yank the locking pins 65 free of the tabs 61. Then, when the pilot pulls the rip cord 45 to open the chute, the sequence of operations will be like that shown in FIGS. 9–12. FIG. 10 shows the chute just after the rip cord has been pulled with the pilot chute having yanked the folded portions of the canopy from the pack, but with the canopy still in a gathered condition. The pilot chute now exerts a separating force on the pack tending to pull the canopy skirt from the deployment bag which is resisted by the break cord 52; this resistance in turn creates a force tending to pull the deployment bag 13 upwardly. Since the deployment bag is now free of the container, this upward movement is permitted, provided the suspension lines 19 will unstow. Since it has been previously pointed out that the break cord 52 is of sufficient strength that the force required to break it is greater than the force required to unstow the suspension lines 19, the suspension lines now unstow in a progressive fashion to slow the pilot down somewhat, in the same manner as caused by unstowing the lines of the B–5 chute. The canopy during this time is still in its gathered (but unfolded) condition so that after the lines are unstowed the chute is in the condition shown in FIG. 11 with the pilot chute exerting an upward force tending to pull the canopy skirt from the bag 13. The break cord 52 is now broken to yank the canopy skirt from the bag, and the bag flies off into space and because the lines are straightened out the canopy "squids out" to suspend the pilot. Thus, FIGS. 9–12 show a delayed opening of the canopy.

It is apparent from the above discussion that the present invention has provided a way of converting the B–5 chute to a two speed chute in a very simple manner, one way being by (1) providing tabs on the quarter bag and openings in the pack or container to permit a lanyard with its locking pins to pass through the holes in the tabs, and (2) by substituting the break cord 52 for the conventional locking loops. It is not possible to utilize the locking loops of the B–5 chute because the suspension lines can be pulled free of the loops only by a force exerted on the lines. Since the loops are secured to the canopy, a force on the canopy merely tends to pull the loops through the openings 41 of the bag 13, but the hank of suspension lines acts as a locking pin preventing this. Thus, if the B–5 locking loops were used in my two speed chute, the chute would not open when the bag was latched (as shown in FIGS. 5–8) to the container.

Another way of converting the B–5 chute is shown in FIG. 2A and comprises providing matching openings in the quarter bag and the pack, nylon loops, a spring to connect the inner ends of the nylon loops, and the lanyard assembly 63, 65, 66 and 69.

It is apparent that a conversion kit could be readily provided and in the case of the forms of the invention shown in the drawings, would comprise the lanyard assembly and either the tabs 61 and break cord 52, or the loops 61a and spring 61b, or equivalent elements.

It is apparent that while the description has been directed to the conversion of the existing B–5 parachute, the concepts of the present invention can be incorporated in various other chutes not only for human use but also for use in dropping inanimate objects. Still further, while the quarter bag has been shown in the laterally extending position it occupies in the B–5 chute, there is no reason why the quarter bag could not be designed to be in an upright position as shown in FIGS. 5–12. While the pockets 31 are shown inclined, they could be transverse, or could be located on flaps so they could turn toward the direction of unstowing. Also, while the tabs 61 are shown connected to the pack or container by a lanyard with locking pins, break cord could be used to connect the tabs, and connected by a clip or latch to an eye 69 on the seat 67. Other ways will suggest themselves to those skilled in the art once my concept has been disclosed.

Another way of providing a two speed chute would be to have no connection at all between the quarter bag 13 and the pack 11. Instead a line could be connected to the break cord and lead to the exterior of the pack and provided with a clip for connection to an eye on the seat. If the line were connected to the seat, the break cord would be broken when the pilot kicked the seat away to provide a fast opening chute. If the line were not connected, the chute would string out before the canopy opened to provide a delayed opening chute.

While I have described my chute in connection with an ejection type seat, the concepts of my invention could be embodied in a chute having no connection to the seat and in which the pilot simply jumped from the plane. For instance, the lanyard 63 could be equipped with a handle so that the pilot could pull the lanyard before pulling the rip cord if he wanted a quick opening chute, or merely pull the rip cord without pulling the line for a delayed opening chute.

It has been stated hereinbefore that the disclosure has been simplified for diagrammatic disclosure. One of the obvious simplifications is in connection with the pack or container 11. In practice, the pack is of flat fabric form with suitable flaps to enclose the canopy, deployment bag, etc. Another simplification is that the spring 51 is usually in a separate pocket of its own. Also, there is usually a metal strip or plate on the pack or container against which the pins 49 bear, and the pins and strip are enclosed in a pocket. A similar strip or plate and pocket are contemplated for the pins 65. Further, the rip cord is usually a flexible cable which extends through a flexible metal conduit. Such an arrangement is also contemplated for the lanyard 63. Other points will not be mentioned because they will be apparent to those skilled in the art.

I have shown the break cord 52 as in direct contact with the canopy. In practice, instead of this, the open end of the bag 13 may be equipped with closely positioned grommets on the lower side thereof so that the break cord could be strung through these grommets and then through the openings 41 to gather and hold the skirt of the canopy.

FIG. 2B shows a modified form of the invention in which the bag 13b has a flap 161 which is normally folded within the container 11. The flap has tabs 163 projecting through openings in the container 11 and engaged by the pins of a lanyard (not shown).

A bag lanyard 165 is secured at 167 to the lower or right-hand edge of the flap 161 and projects at its left-hand end through loops 169 of strong break cord 169. The cord 169 performs the same function as cord 52, but breakage of cord 169 is not required at slow plane speed operation. Instead, if the tabs 163 are locked to the container, the pilot chute will pull the bag 13b away from the container as the pilot chute unfolds the canopy 17. This action unfolds the flap 161 to move the loops 169 off the bag lanyard 165 to free the canopy skirt for withdrawal from the bag prior to unstowing the lines 19 (like that shown in FIGS. 5–8). Thus, even though the plane speed is very low, the chute will open quickly, because no reliance is placed on the pilot chute breaking the cord 169.

If the tabs 163 are released by pulling the lanyard for the tabs, the loops 169 remain on the lanyard 165, and thus the action is like that in FIGS. 9–12. Therefore after the lines are unstowed, the cord 169 is broken and the skirt of the canopy 17 is pulled from the bag and the canopy opens.

The FIG. 2B construction could utilize the elastomer loop and spring arrangement of FIG. 2A instead of the tab and lanyard arrangement of FIG. 2.

Having described the invention in what is considered to be the preferred embodiment thereof, it is desired that it be understood that the invention is not to be limited other than by the provisions of the following claims.

I claim:

1. A two speed parachute comprising:
a canopy,
suspension lines,
a bag containing the skirt of said canopy and having pockets stowing said lines,
and means operable when actuated one way for effecting release of said skirt from said bag prior to release of said lines and operable when actuated a second way for effecting release of said lines prior to release of said skirt,
a container for said bag and canopy and lines,
said means including mechanism releasably connecting said bag to said container.

2. A two speed parachute comprising:
a canopy,
suspension lines,
a bag containing the skirt of said canopy and having pockets stowing said lines,
and means operable when actuated one way for effecting release of said skirt from said bag prior to release of said lines and operable when actuated a second way for effecting release of said lines prior to release of said skirt,
a container for said bag and canopy and lines,
said means including mechanism releasably connecting said bag to said container,
and break cord releasably holding said skirt in said bag.

3. A two speed parachute comprising:
a canopy,
suspension lines,
a bag containing the skirt of said canopy and having pockets stowing said lines,
and means operable when actuated one way for effecting release of said skirt from said bag prior to release of said lines and operable when actuated a second way for effecting release of said lines prior to release of said skirt,
a container for said bag and canopy and lines,
said means including mechanism releasably connecting said bag to said container,
said mechanism having means for releasable connection to a pilot's seat.

4. In a parachute of the type comprising:
a canopy having a body portion and a skirt portion,
suspension lines connected to said canopy,
a container connected to said suspension lines and having means for connection to an object to be supported by said parachute,
a pilot chute connected to said canopy,
a deployment bag adapted to contain the skirt of said canopy and having pockets to tightly stow said suspension lines and thereby to frictionally resist release of said suspension lines, but to release said lines under the proper applied force for feeding out of said lines either in a direction toward said canopy or in a direction toward said container,
rip cord means for releasably closing said container with said deployment bag within said container, and with the body of said canopy disposed within said container in a gathered and folded condition, and with said pilot chute disposed within said container in a manner to be released upon actuation of said rip cord means,
said pilot chute adapted, when released during a free fall of said parachute and the object to which it is secured, to open and exert a separating force tending to unfold said canopy and jerk said canopy skirt from said bag and unstow said suspension lines,
the improvement comprising first means releasably securing said bag to said container,
second means releasably securing said canopy to said bag at a place above said skirt,
means for effecting release of said first means without release of said second means or for effecting release of said second means and thereafter release of said first means.

5. In a parachute of the type comprising:
a canopy having a body portion and a skirt portion,
suspension lines connected to said canopy,
a container connected to said suspension lines and having means for connection to an object to be supported by said parachute,
a pilot chute connected to said canopy,
a deployment bag adapted to contain the skirt of said canopy and having pockets to tightly stow said suspension lines and thereby to frictionally resist release of said suspension lines, but to release said lines under the proper applied force for feeding out of said lines either in a direction toward said canopy or in a direction toward said container,
rip cord means for releasably closing said container with said deployment bag within said container, and with the body of said canopy disposed within said container in a gathered and folded condition, and with said pilot chute disposed within said container in a manner to be released upon actuation of said rip cord means,
said pilot chute adapted, when released during a free fall of said parachute and the object to which it is secured, to open and exert a separating force tending to unfold said canopy and jerk said canopy skirt from said bag and unstow said suspension lines,
the improvement comprising first means releasably securing said bag to said container,
second means releasably securing said canopy to said bag at a place above said skirt,
means for effecting release of said first means without release of said second means or for effecting release of said second means and thereafter release of said first means,
said first means, when not released, being sufficiently strong to cause unstowing of said lines but being sufficiently weak to thereafter automatically release under the force of said pilot chute.

6. In an ejection structure of the type having
a seat to be ejected from an aircraft and to be occupied by a person or object,
a parachute of the type comprising,
a canopy having a body portion and a skirt portion,
suspension lines connected to said canopy,
a container connected to said suspension lines and having means for connection to an object to be supported by said parachute,
a pilot chute connected to said canopy, a deployment bag adapted to contain the skirt of said canopy and having pockets to tightly stow said suspension lines and thereby to frictionally resist release of said suspension lines, but to release said lines under the proper applied force for feeding out of said lines either in a direction toward said canopy or in a direction toward said container, rip cord means for releasably closing said container with said deployment bag within said container, and with the body of said canopy disposed within said container in a gathered and folded condition, and with said pilot chute disposed within said container in a manner to be released upon actuation of said rip cord means, said pilot chute adapted, when released during a free fall of said parachute and the object to which it is secured, to open and exert a separating force tending to unfold said canopy and jerk said canopy skirt from said bag and unstow said suspension lines, the improvemnet comprising first means releasably securing said bag to said container, second means releasably securing said canopy to said bag at a place above said skirt, means for effecting release of said first means without release of said second means or for effecting release of said second means and thereafter release of said first means, said first means, when not released, being sufficiently strong to cause unstowing of said lines but being sufficiently weak to thereafter automatically release under the force of said pilot chute.

7. In an ejection structure of the type having
a seat to be ejected from an aircraft and to be occupied by a person or object,
a parachute of the type comprising,
a canopy having a body portion and a skirt portion,
suspension lines connected to said canopy,
a container connected to said suspension lines and having means for connection to an object to be supported by said parachute,
a pilot chute connected to said canopy,
a deployment bag adapted to contain the skirt of said canopy and having pockets to tightly stow said suspension lines and thereby to frictionally resist release of said suspension lines, but to release said lines under the proper applied force for feeding out of said lines either in a direction toward said canopy or in a direction toward said container,
rip cord means for releasably closing said container with said deployment bag within said container, and with the body of said canopy disposed within said container in a gathered and folded condition, and with said pilot chute disposed within said container in a manner to be released upon actuation of said rip cord means,
said pilot chute adapted, when released during a free fall of said parachute and the object to which it is secured, to open and exert a separating force tending to unfold said canopy and jerk said canopy skirt from said bag and unstow said suspension lines,
the improvement comprising first means releasably securing said bag to said container,
second means releasably securing said canopy to said bag at a place above said skirt,
means for effecting release of said first means without release of said second means or for effecting release of said second means and thereafter release of said first means,
said first means, when not released, being sufficiently strong to cause unstowing of said lines but being sufficiently weak to thereafter automatically release under the force of said pilot chute,
said first means including elements on said bag projecting through said container and further including a lanyard releasably engaging said elements and having a clip for detachable connection to an eye on the pilot's seat, so that when said clip is connected to said eye, separation of said seat and chute will separate said lanyard from said elements to enable separation of said bag and container,
said second means including break cord means extending around said canopy and extending through mouth portions of said bag and around a hank of said suspension lines.

8. In an ejection structure of the type having
a seat to be ejected from an aircraft and to be occupied by a person or object,
a parachute of the type comprising,
a canopy having a body portion and a skirt portion,
suspension lines connected to said canopy,
a container connected to said suspension lines and having means for connection to an object to be supported by said parachute,
a pilot chute connected to said canopy,
a deployment bag adapted to contain the skirt of said canopy and having pockets to tightly stow said suspension lines and thereby to frictionally resist release of said suspension lines, but to release said lines under the proper applied force for feeding out of said lines either in a direction toward said canopy or in a direction toward said container,
rip cord means for releasably closing said container with said deployment bag within said container, and with the body of said canopy disposed within said container in a gathered and folded condition, and with said pilot chute disposed within said container in a manner to be released upon actuation of said rip cord means,
said pilot chute adapted, when released during a free fall of said parachute and the object to which it is secured, to open and exert a separating force tending to unfold said canopy and jerk said canopy skirt from said bag and unstow said suspension lines,
the improvement comprising first means releasably securing said bag to said container,
second means releasably securing said canopy to said bag at a place above said skirt,
means for effecting release of said first means without release of said second means or for effecting release of said second means and thereafter release of said first means,
said first means, when not released, being sufficiently strong to cause unstowing of said lines but being sufficiently weak to thereafter automatically release under the force of said pilot chute,
said first means including elements on said bag projecting through said container and further including a lanyard releasably engaging said elements and having a clip for detachable connection to an eye on the pilot's seat, so that when said clip is connected to said eye, separation of said seat and chute will separate said lanyard from said elements to enable separation of said bag and container,
said second means including break cord means extending around said canopy and extending through mouth portions of said bag and around a hank of said suspension lines,
said second means further including means releasably holding said break cord means in place, the just-mentioned holding means including a lanyard extending through loop portions of said break cord means in tight frictional engagement therewith,
said bag having a foldable flap carrying the mentioned elements of said bag, said flap providing for lost motion between the bag and container,
the lanyard for said break cord being secured to the lower portion of said flap so that said lost motion can effect release of said break cord means.

9. In a parachute of the type comprising:
a canopy having a body portion and a skirt portion,
suspension lines connected to said canopy,
a container connected to said suspension lines and having means for connection to an object to be supported by said parachute,
a pilot chute connected to said canopy,
a deployment bag adapted to contain the skirt of said canopy and having pockets to tightly stow said suspension lines and thereby to frictionally resist release of said suspension lines, but to release said lines under the proper applied force for feeding out of said lines either in a direction toward said canopy or in a direction toward said container,
rip cord means for releasably closing said container with said deployment bag within said container, and with the body of said canopy disposed within said container in a gathered and folded condition, and with said pilot chute disposed within said container in a manner to be released upon actuation of said rip cord means,
said pilot chute adapted, when released during a free fall of said parachute and the object to which it is secured, to open and exert a separating force tending to unfold said canopy and jerk said canopy skirt from said bag and unstow said suspension lines,
the improvement comprising first means releasably securing said bag to said container,
second means releasably securing said canopy to said bag at a place above said skirt,
means for effecting release of said first means without release of said second means or for effecting release of said second means and thereafter release of said first means,
said first means, when not released, being sufficiently strong to cause unstowing of said lines but being sufficiently weak to thereafter automatically release under the force of said pilot chute,
said first means including elements on said bag projecting through said container and further including a lanyard releasably engaging said elements and having a clip for detachable connection to an eye on the pilot's seat, so that when said clip is connected to said eye, separation of said seat and chute will separate said lanyard from said elements to enable separation of said bag and container,
said second means including break cord means extending around said canopy and extending through mouth portions of said bag and around a hank of said suspension lines.

10. In a parachute of the type comprising:
a canopy having a body portion and a skirt portion,
suspension lines connected to said canopy,
a container connected to said suspension lines and having means for connection to an object to be supported by said parachute,
a pilot chute connected to said canopy,
a deployment bag adapted to contain the skirt of said canopy and having pockets to tightly slow said suspension lines and thereby to frictionally resist release of said suspension lines, but to release said lines under the proper applied force for feeding out of said lines either in a direction toward said canopy or in a direction toward said container,
rip cord means for releasably closing said container with said deployment bag within said container, and with the body of said canopy disposed within said container in a gathered and folded condition, and with said pilot chute disposed within said container in a manner to be released upon actuation of said rip cord means,
said pilot chute adapted, when released during a free fall of said parachute and the object to which it is secured, to open and exert a separating force tending to unfold said canopy and jerk said canopy skirt from said bag and unstow said suspension lines,
the improvement comprising first means releasably securing said bag to said container,
second means releasably securing said canopy to said bag at a place above said skirt,
means for effecting release of said first means without release of said second means or for effecting release of said second means and thereafter release of said first means,
said first means, when not released, being sufficiently strong to cause unstowing of said lines but being sufficiently weak to thereafter automatically release under the force of said pilot chute,
said first means including elements on said bag projecting through said container and further including a lanyard releasably engaging said elements and having a clip for detachable connection to an eye on the pilot's seat, so that when said clip is connected to said eye, separation of said seat and chute will separate said lanyard from said elements to enable separation of said bag and container,
said second means including break cord means extending around said canopy and extending through mouth portions of said bag and around a hank of said suspension lines,
said second means further including means releasably holding said break cord means in place, the just-mentioned holding means including a lanyard extending through loop portions of said break cord means in tight frictional engagement therewith,
said bag having a foldable flap carrying the mentioned elements of said bag, said flap providing for lost motion between the bag and container,
the lanyard for said break cord being secured to the lower portion of said flap so that said lost motion can effect release of said break cord means.

References Cited in the file of this patent
UNITED STATES PATENTS

| | | |
|---|---|---|
| 2,749,066 | Barnes et al. | June 5, 1956 |
| 3,010,685 | Stencel | Nov. 28, 1961 |